(No Model.)
W. G. FLANDERS.
EGG BEATER.
No. 291,890. Patented Jan. 15, 1884.
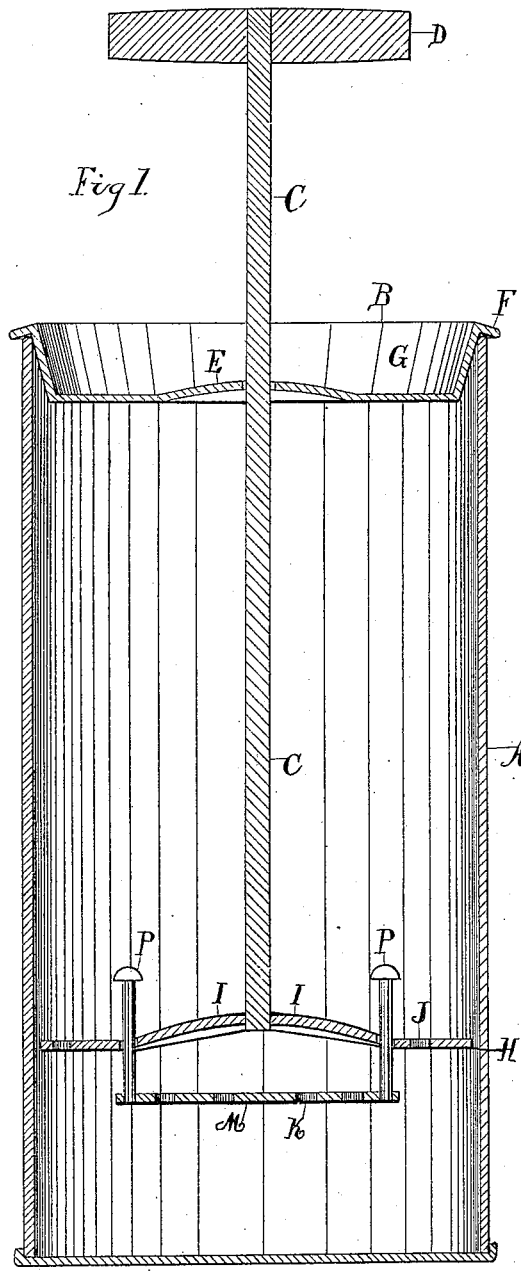
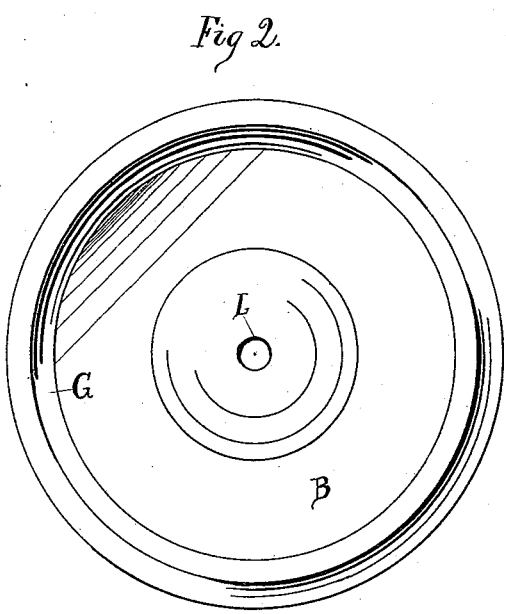
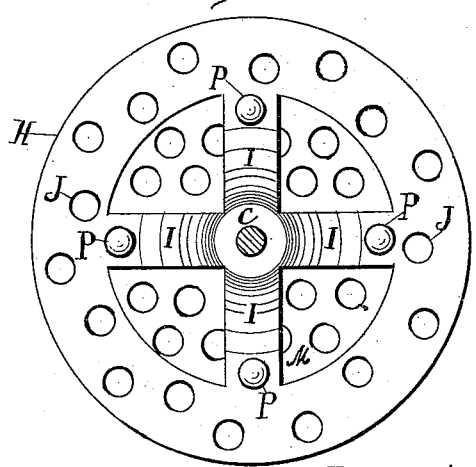
Witnesses
John T. Booth
R. M. Townsend Jr.
Inventor
Wm. G. Flanders
by Geo. A. Mosher
Atty.

UNITED STATES PATENT OFFICE.

WILLIAM G. FLANDERS, OF TROY, NEW YORK.

EGG-BEATER.

SPECIFICATION forming part of Letters Patent No. 291,890, dated January 15, 1884.

Application filed June 13, 1883. (No model.)

*To all whom it may concern:*

Be it known that I, WILLIAM G. FLANDERS, a resident of the city of Troy, in the county of Rensselaer and State of New York, have invented certain new and useful Improvements in Egg-Beaters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to egg-beaters; and it consists of a perforated valved plunger or beater working in a cylindrical vessel or case closed at one end and provided at the other with a concavo-convex cover through which slides the shaft or stem of the plunger.

The object of my invention is to provide an inclosed egg-beater that will quickly beat up eggs for culinary purposes.

Figure 1 is a central vertical section of my device. Fig. 2 is a plan view of the cover. Fig. 3 is a plan view of the valved plunger and cross-section of the shaft.

A is an upright hollow cylinder, closed at the bottom, and provided with the dish-shaped cover B, having the inwardly-inclined surface G, and the rim F, projecting out over the edges of A, the cover being stamped from a single piece of sheet metal. The bottom of the cover is convexed, as shown at E, and provided in its center with an aperture, L, to receive shaft or stem C. The shaft is provided at its projecting end with any suitable handle, D, and at its inclosed end with plunger or beater H, connected with the shaft by radial arms I. The arms may be convexed transversely to give them additional strength. The plunger-rim contains numerous small apertures, J. There are also in the rim or arms I small apertures to receive the headed rods or pins P, which are fixed at their lower ends to the circular disk or valve M, also provided with numerous small apertures, K. When the plunger is forced to the bottom of the vessel, the inner portion of rim H rests upon the outer portion of valve or disk M, and the rods P project up above the plunger, and when the plunger is drawn upward the rim and disk are separated until the heads of the rods strike the plunger, the rods sliding through the apertures before mentioned, from which it appears that if the vessel is filled with any liquid the action of the plunger and disk or valve will be like that of a valved pump-plunger, except that the operation is reversed, the valve closing as the plunger is forced downward and opening again as the plunger is drawn up. It also appears from the above that the contents of the vessel will be forced through the small apertures J and K when the plunger goes down, and be allowed to pass down between the valve and rim as the plunger is drawn up. Consequently the contents are greatly agitated by forcing the plunger back and forth in the case, which is done by handle D, and when the contents are whites or yelks of eggs they are quickly prepared for culinary purposes. By drawing the plunger up against the cover B the contents of the vessel are forced beneath the plunger, and the shaft C is freed from it, the contents being positively forced from one side of the plunger to the other until the work of beating is complete. The cover is made convex at E, to receive the convexed arms I of the plunger.

By making the cover convex in form, with the inwardly-inclined surface G on the upper side, I am able to dispense with additional devices to prevent loss of the contents of the beater, which may follow the stem up through the stem-opening in the cover, and the cover is easily retained in place when the beater is in use. Such a form also permits of the construction of the cover from one piece of sheet metal stamped into shape by suitable dies, which very greatly cheapens its construction.

What I claim as new, and desire to secure by Letters Patent, is—

1. A concave cover provided with the inwardly-inclined surface G, stamped from a single piece of sheet metal, and provided with a central stem-opening, in combination with a stem and plunger and inclosing-case, substantially as described, and for the purposes set forth.

2. In an egg-beater, a perforated plunger having a central opening, in combination with a suitably-connected valve or disk, to close said opening when the plunger moves in one direction and open it again when it moves in the opposite direction, substantially as described, and for the purposes set forth.

3. In an egg-beater, the combination, with a stem and plunger having a suitable inclosing-case, of a perforated disk attached to said plunger by suitable sliding supports, substantially as described, and for the purposes set forth.

4. The combination of stem C, perforated plunger H, perforated disk K, pins P, and case A, substantially as described, and for the purposes set forth.

In testimony whereof I have hereunto set my hand this 11th day of June, 1883.

WILLIAM G. FLANDERS.

Witnesses:
 GEO. A. MOSHER,
 JOHN T. BOOTH.